Patented Aug. 29, 1933

1,924,990

UNITED STATES PATENT OFFICE 1,924,990

STABILIZED EGG PRODUCT

Benjamin R. Harris, Carl J. Beckert, and Wolf Kritchevsky, Chicago, Ill.

No Drawing. Application April 8, 1929
Serial No. 353,684

2 Claims. (Cl. 167—63)

In the copending application of Kritchevsky, Beckert and Harris, Serial No. 353,664 filed of even date herewith, we have described a number of compositions of matter consisting of the dihydric alcohol homologous series and their derivatives, in combination with egg material, oils, waxes and soaps.

We have found that glycerine, though not being a di-hydric alcohol, and which usually and in most instances cannot be considered as an equivalent of the di-hydric alcohols, can, nevertheless, be used in a series of products containing egg material analogous to those made with the di-hydric alcohols and their derivatives.

The reason that we do not consider glycerine as an equivalent of ethylene glycol, and the homologous series of alkyl glycols, is that it is much less active in its antiseptic value than the glycols, that it has entirely different physical characteristics than the glycols, and also behaves altogether differently in combination with egg yolk material. For instance, while 16–17% of ethylene or di-ethylene glycol or their derivatives, calculated on the water content, is sufficient to stabilize the egg materials, it requires a minimum of about 25% of glycerine to accomplish the same results.

We have found also that when the amount of glycerine approximates 60% of the content of water in the egg material, we have a different phenomenon than in the case of glycols, viz. when the glycerine equals approximately 56% of the amount of water present, the egg material will precipitate, yet when an amount of glycerine is added that equals or exceeds the amount of water present, it will not precipitate and forms uniform emulsions.

Using either of these homogeneous products as a base, we may, as described in our copending application concerned with the use of the glycols and their derivatives, obtain a product, rather a series of products, in combination with vegetable oils, mineral oils, sulphonated oils, ordinary or sulphonated soaps, waxes, sulphur or other chemicals entirely suitable to our purpose, such as a shampoo or scalp treatment for the cosmetic trade, a product for facial massages, or a salve or salve-base for medicinal purposes, or a cream for cleansing purposes suitable for the cleaning or softening of leather.

The consistency of the products can be governed and we obtain a liquid, semi-paste, paste, semi-solid, or solid according to the modification of the aggregate materials added to the originally described egg products. For instance, to obtain a paste for a hair shampoo, we treat 100 pounds of fresh commercial egg yolk, which is substantially pure egg yolk, with a small percentage of egg white contained therein, and the water content of the same being about 58% with 25 pounds of glycerine. This product, per se, will be stable for any length of time. In order to make a paste of this mixture, which distributes easily through the hair, we add 10 pounds of anhydrous sulphonated soap. If the soap should contain any water, sufficient glycerine should be added to make the water and glycerine amounts equal.

Sulphonated soap mentioned in the previous example can be substituted with or replaced with sulphonated oil, or vegetable oils, like castor or corn oil, mineral oils, like white Russian mineral oil or vaseline, or other oily or waxy substances like di-ethyl phthalate, cetyl alcohol, or various waxes etc.

The glycerine mentioned in the foregoing example may be substituted by its derivatives such as its acetates, ethyl glycerine etc.

Further, the egg yolk mentioned in the foregoing example can be substituted with or replaced by natural egg-white material as it comes from the shell, or by the whole egg.

The following represent a few examples of the products we find suitable for our purpose:

| | Pounds |
|---|---|
| No. 1— | |
| Egg yolk | 100 |
| Glycerine | 25 |
| No. 2— | |
| Egg white | 100 |
| Glycerine | 41 |
| No. 3— | |
| Whole mixed eggs | 100 |
| Mono-acetate of glycerine | 33 |
| No. 4— | |
| Egg yolks | 100 |
| Glycerine | 30 |
| Sulphonated oil | 60 |
| No. 5— | |
| Egg yolk | 100 |
| Glycerine | 26 |
| Corn oil | 100 |
| Perfume | .5 |
| No. 6— | |
| Whole egg | 100 |
| Glycerine | 25 |
| Petroleum | 3 |

No. 7—

| | Pounds |
|---|---|
| Egg yolk | 100 |
| Glycerine | 75 |
| Corn oil | 50 |
| Sulphur | .5 |

No. 8—

| | |
|---|---|
| Egg yolk | 100 |
| Glycerine | 20 |
| Starch | 5 |
| Perfume | .5 |

No. 9—

| | |
|---|---|
| Egg yolk | 100 |
| Glycerine | 20 |
| Chrysarobine | 2 |
| Perfume | .5 |

No. 10—

| | |
|---|---|
| Egg yolk | 100 |
| Glycerine | 20 |
| Ichthyol | 5 |
| Perfume | .5 |

When substantially more than 60% of the glycerine is used it serves to dehydrate and seriously interfere with the emulsifying properties of the product.

The examples just cited are interchangeable with reference to the stabilizing agent, i. e. glycerine mono-acetate or glycerine tri-acetate may be used in place of the glycerine, or as may be any of the other glycerine derivatives, so long as the amount of the glycerine or glycerine derivative is present in a quantity equal to, or exceeding that of the water present.

The selfsame interchanging of the egg materials such as the use of whites, whites in excess of the yolk material, or nearly pure egg yolk material will not change the character of our product for the specific uses intended.

We have also found that instead of using fresh egg material, we may utilize the dried egg materials such as dried egg albumen or dried egg yolk, by first adding the requisite amount of water and emulsifying the material, and then handling in the same manner as noted in our original examples.

The quantities of the glycerine and its derivatives may be varied in any proportion that will preserve the egg material and not coagulate or precipitate the mass.

Under "egg substance" we understand the solid matter that makes up the yolk, or the white minus the moisture present in it; in other words, egg substance and moisture would mean either natural yolk, natural white, or the whole egg.

Under the expression "egg material" we mean either egg yolks, pure or mixed with a little white as they come from the separating plants, egg whites, pure or mixed with a little yolk as they occur naturally, as the egg is separated, mixed eggs, in which the yolk and the white is mixed in their natural proportion or having added either more yolk, white or both, or powdered egg yolk and white mixed, emulsified with any desired amount of moisture, separately or together.

We claim:

1. A cosmetic adapted for external use and stable under ordinary climatic conditions, comprising an emulsion of egg material, a preservative comprising a trihydric alcohol of the general formula $$XO-CX_2CX-(CX_2)_{n-1}-CX_2OX$$
$$\phantom{XO-CX_2C}|$$
$$\phantom{XO-CX_2CX-}OX$$

in which $n$ is any whole number, X is hydrogen, an alkyl group like methyl, ethyl or an hydroxy group like $CH_2OH$, $CH_2CH_2OH$ or an acid radical like acetyl and derivatives of the acid radical, said preservative being present in the proportion of not less than 25% and no more than 60% of the amount of water present in the finished product, and a sulphonated oil.

2. A cosmetic stable at ordinary temperature, comprising egg yolk, glycerine and sulphonated oil, the glycerine being present in the proportion of not less than 25% and not more than 60% of the amount of water in the finished product.

BENJAMIN R. HARRIS.
CARL J. BECKERT.
WOLF KRITCHEVSKY.